(12) United States Patent
Arai et al.

(10) Patent No.: US 11,529,997 B2
(45) Date of Patent: Dec. 20, 2022

(54) FRAME OF WORK VEHICLE AND WORK VEHICLE

(71) Applicant: Komatsu Ltd., Tokyo (JP)

(72) Inventors: Yuki Arai, Tokyo (JP); Muneo Harada, Tokyo (JP)

(73) Assignee: Komatsu Ltd., Tokyo (JP)

( * ) Notice: Subject to any disclaimer, the term of this patent is extended or adjusted under 35 U.S.C. 154(b) by 344 days.

(21) Appl. No.: 16/962,638

(22) PCT Filed: Oct. 31, 2019

(86) PCT No.: PCT/JP2019/042719
§ 371 (c)(1),
(2) Date: Jul. 16, 2020

(87) PCT Pub. No.: WO2021/084673
PCT Pub. Date: May 6, 2021

(65) Prior Publication Data
US 2021/0403093 A1    Dec. 30, 2021

(51) Int. Cl.
*B62D 21/18* (2006.01)
(52) U.S. Cl.
CPC .................... *B62D 21/186* (2013.01)
(58) Field of Classification Search
CPC ....... B62D 25/08; B62D 25/02; B62D 21/186
USPC ............. 296/203.01; 414/727, 722, 697, 680
See application file for complete search history.

(56) References Cited

U.S. PATENT DOCUMENTS

| | | | |
|---|---|---|---|
| 4,244,662 A * | 1/1981 | Olson | E01H 4/02 37/220 |
| 4,260,322 A * | 4/1981 | Cameron | E02F 3/36 212/347 |
| 4,807,461 A | 2/1989 | Brimeyer et al. | |
| 5,653,155 A | 8/1997 | Hausman et al. | |
| 5,741,026 A * | 4/1998 | Bonnville | B62D 29/008 280/288 |
| 6,158,525 A | 12/2000 | Inoue | |
| 6,283,225 B1 | 9/2001 | Hermonson | |

(Continued)

FOREIGN PATENT DOCUMENTS

| | | |
|---|---|---|
| CN | 102852230 A | 1/2013 |
| CN | 103080428 A | 5/2013 |

(Continued)

*Primary Examiner* — D Glenn Dayoan
*Assistant Examiner* — Sunsurraye Westbrook
(74) *Attorney, Agent, or Firm* — Locke Lord LLP

(57) ABSTRACT

A frame of a work vehicle includes an upper plate that has a plate shape and that forms an upper surface of the frame extending along a front-rear direction; a lower plate that has a plate shape and that is opposite to the upper plate in an up-down direction and forms a lower surface of the frame; a vertical wall that is disposed between the upper plate and the lower plate in the up-down direction and connects the upper plate to the lower plate; and an attachment portion to which an actuator that moves work equipment in the up-down direction is attached, in which at least one of the upper plate and the lower plate includes a center portion, a first extension portion extending from the center portion, a second extension portion extending from the center portion, and a continuous portion connecting the first extension portion to the second extension portion.

20 Claims, 10 Drawing Sheets

(56) References Cited

U.S. PATENT DOCUMENTS

| | | | | |
|---|---|---|---|---|
| 8,042,834 B2* | 10/2011 | Miura | ................ | B62D 21/02 |
| | | | | 280/784 |
| 8,869,911 B2* | 10/2014 | Anderson | ............ | E02F 3/3414 |
| | | | | 172/815 |
| 2013/0175064 A1 | 7/2013 | Yamazaki | | |
| 2013/0206432 A1 | 8/2013 | Staade et al. | | |

FOREIGN PATENT DOCUMENTS

| | | |
|---|---|---|
| CN | 109537656 A | 3/2019 |
| JP | 50-022304 U | 3/1975 |
| JP | 62-170619 A | 7/1987 |
| JP | 2000-027229 A | 1/2000 |

\* cited by examiner

FRAME OF WORK VEHICLE AND WORK VEHICLE

TECHNICAL FIELD

The present invention relates to a frame of a work vehicle and the work vehicle.

BACKGROUND ART

As the work vehicle, a motor grader that performs grading or snow removal is known. For example, Patent Literature 1 discloses a configuration including a frame extending along a front-rear direction, a blade for performing grading or the like, and a lift cylinder that can move the blade in an up-down direction. The lift cylinder is connected to the frame via a bracket or the like.

CITATION LIST

Patent Literature

[Patent Literature 1]
United States Patent Application, Publication No. 2013/0206432

SUMMARY OF INVENTION

Technical Problem

It is necessary that the frame is a structure that can withstand a load received from the blade via an actuator such as the lift cylinder. For example, in a case where grading or the like is performed by lowering the blade using the actuator, the blade is pulled on the ground in the front-rear direction. In this case, the blade receives a load from the front-rear direction by a load received from the excavated earth. Further, the blade receives a load from the up-down direction by a load received from unevenness of the road surface and rocks, in some cases. In this case, a torsional stress around the axis along a left-right direction occurs in the vicinity of the bracket of the frame which supports the actuator.

For example, in a case where a load is applied to the blade in the up-down direction, the load may be different on a left side portion and a right side portion of the blade. In this case, a torsional stress around the axis along the front-rear direction occurs in the vicinity of the bracket of the frame which supports the actuator.

Therefore, it is desired to improve mechanical strength of a structure portion supporting the actuator in the frame.

An object of the invention is to provide a frame of a work vehicle and the work vehicle which can improve mechanical strength of a structure portion supporting an actuator.

Solution to Problem

A frame of a work vehicle according to an aspect of the invention includes: an upper plate that has a plate shape and that forms an upper surface of the frame extending along a front-rear direction; a lower plate that has a plate shape and that is opposite to the upper plate in an up-down direction and forms a lower surface of the frame; a vertical wall that is disposed between the upper plate and the lower plate in the up-down direction and connects the upper plate to the lower plate; and an attachment portion to which an actuator that moves work equipment in the up-down direction is attached, in which at least one of the upper plate and the lower plate includes a center portion, a first extension portion extending from the center portion in the front-rear direction, a second extension portion extending from the center portion in a left-right direction, and a continuous portion connecting the first extension portion to the second extension portion, and the attachment portion is provided at both ends of the second extension portion in the left-right direction.

With this configuration, in a case where grading or the like is performed by lowering the work equipment using the actuator, the work equipment receives a load from the front-rear direction. In this case, the load applied to the frame from the work equipment via the lift cylinder is distributed to the entire frame via the continuous portion and the second extension portion. Therefore, the configuration becomes more resistant to the torsion around the axis along the left-right direction as compared with a configuration having no continuous portion. Further, in a case where a load is applied to the work equipment in the up-down direction, the load may be different on a left side portion and a right side portion of the work equipment. Even in this case, the load applied to the frame from the work equipment via the actuator is distributed to the entire frame via the continuous portion and the second extension portion. Therefore, the configuration becomes more resistant to the torsion around the axis along the front-rear direction as compared with a configuration having no continuous portion. Accordingly, it is possible to improve the mechanical strength of the structure portion supporting the actuator.

Advantageous Effects of Invention

According to the aspect of the invention, it is possible to improve the mechanical strength of the structure portion supporting the lift cylinder.

DESCRIPTION OF EMBODIMENTS

Hereinafter, an embodiment of the invention will be described with reference to the drawings. In the embodiment, a motor grader is described as an example of the work vehicle.

\<Work Vehicle\>

Figure 1:
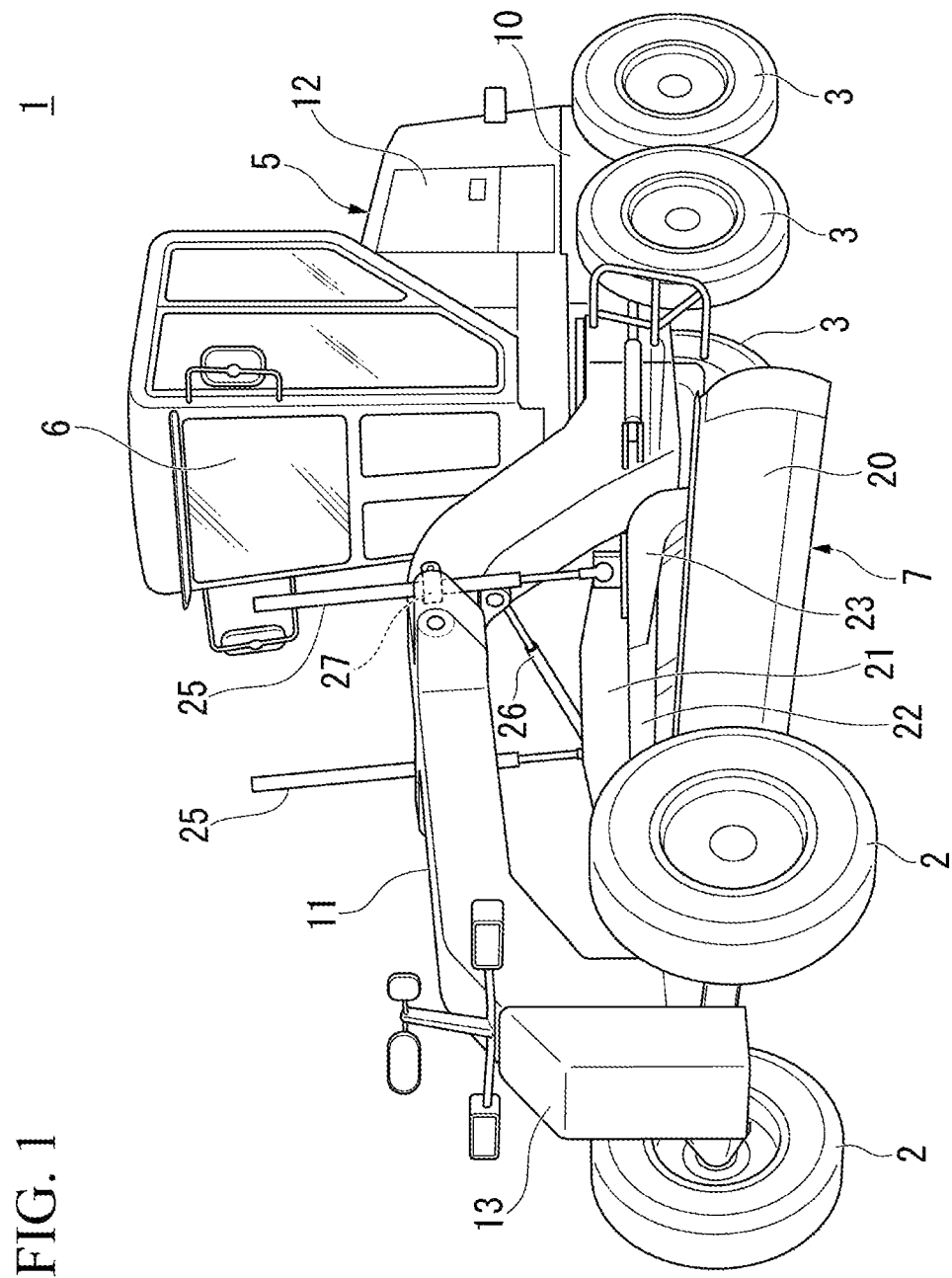
FIG. 1 is a perspective view of a work vehicle according to an embodiment.

As shown in FIG. 1, a motor grader 1 as the work vehicle includes traveling wheels 2 and 3, a vehicle body 5, a cab 6, and work equipment 7. The work equipment 7 includes a blade 20. The motor grader 1 performs work such as grading, snow removal, light cutting, and material mixing using the blade 20. The motor grader 1 includes front wheels 2 and rear wheels 3 as the traveling wheels 2 and 3. The motor grader 1 of the embodiment includes two front wheels 2, one on each side, and four rear wheels 3, two on each side.

In the following, a front-rear direction means a front-rear direction of the motor grader 1. That is, the front-rear direction means a front-rear direction viewed from a driver sitting on a driver' seat of the cab 6. A left-right direction means a vehicle width direction of the motor grader 1. That is, the left-right direction means a left-right direction viewed from the driver sitting on the driver' seat of the cab 6.

The vehicle body 5 includes a rear frame 10, a front frame 11 (frame), and an outer cover 12. The rear frame 10 supports the outer cover 12 and components (not shown) such as an engine disposed in an engine compartment. The outer cover 12 covers the engine compartment behind the cab 6. Each of four rear wheels 3 is attached to the rear frame 10 so as to be rotatable by driving force from the engine. The front frame 11 is attached to the front of the rear frame 10. A counterweight 13 is attached to a front end of the front frame 11. Each of two front wheels 2 is attached to a lower portion of the front end of the front frame 11 so as to be rotatable.

The cab 6 is mounted on a front portion of the rear frame 10. Inside the cab 6, operation units (not shown) such as a handle, a shift lever, an operation lever of the work equipment 7, a brake, an accelerator pedal, and an inching pedal are provided.

The work equipment 7 includes a drawbar 21, a circle 22, and a support 23 in addition to the blade 20. The drawbar 21 is connected to the front frame 11 by actuators such as a pair of left and right lift cylinders 25 and a drawbar shift cylinder 26. As the actuator, for example, a hydraulic cylinder can be used, but an electric cylinder that can be extended and contracted by an electric motor may be used. The drawbar 21 can be moved up and down and can swing around an axis in the front-rear direction by the pair of lift cylinders 25. The drawbar 21 can relatively be moved left and right with respect to the front frame 11 by the drawbar shift cylinder 26.

The circle 22 is provided below the drawbar 21 so as to be rotatable around an axis along an up-down direction via a bearing (not shown). A pair of supports 23 is fixed to an outer circumferential surface of the circle 22 such that the supports 23 are separated in the left-right direction. Each support 23 extends backward along the outer circumferential surface of the circle 22 and then extends by being curved downward.

The blade 20 extends in a horizontal direction below the circle 22. The blade 20 is supported by the pair of supports 23. That is, the blade 20 is supported by the circle 22 via the supports 23. The blade 20 can relatively be moved in an extension direction of the blade 20 with respect to the circle 22 by a blade shift cylinder (not shown).

\<Front Frame\>

Figure 2:
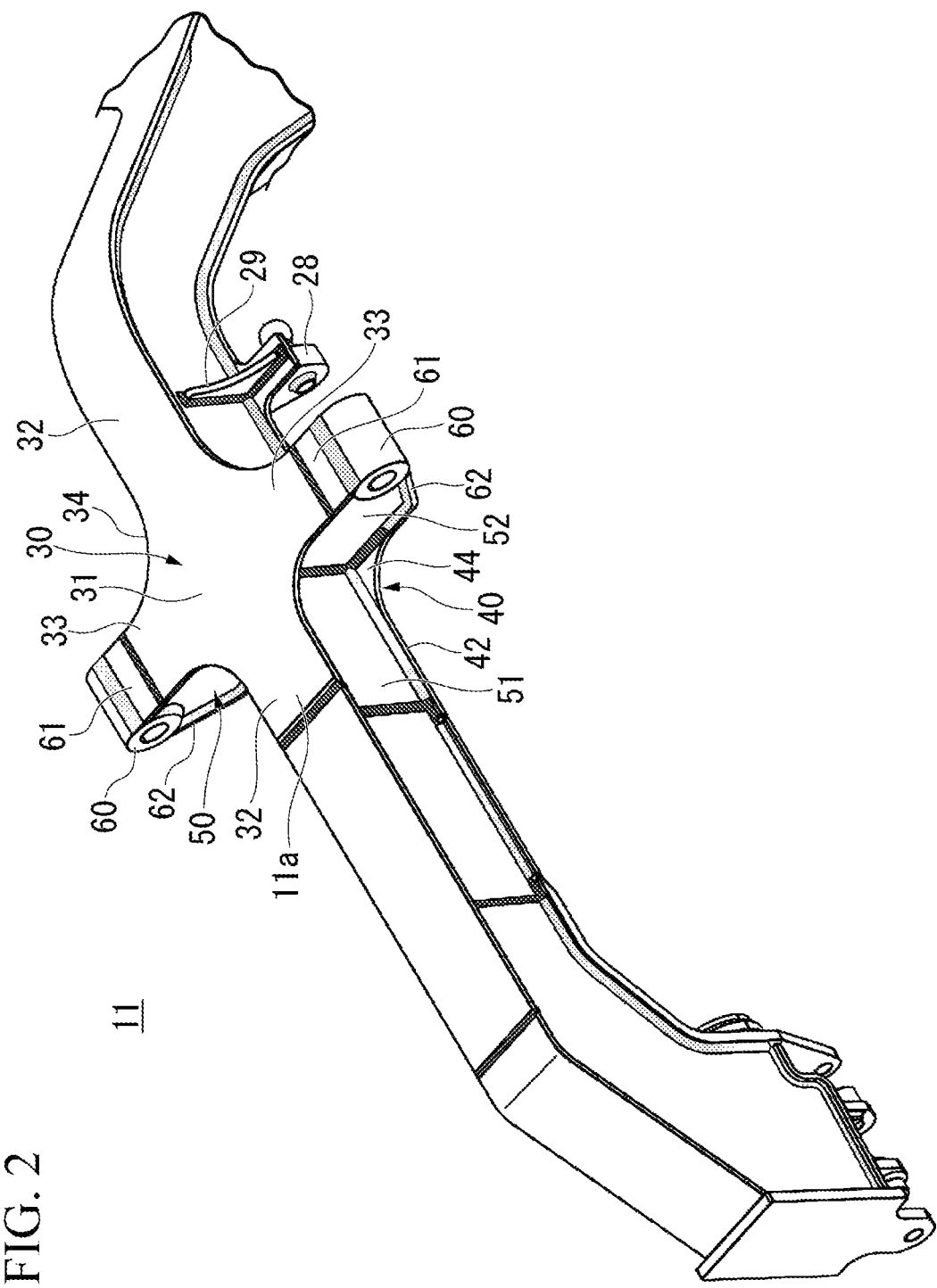
FIG. 2 is a perspective view of a frame according to the embodiment.
Figure 3:
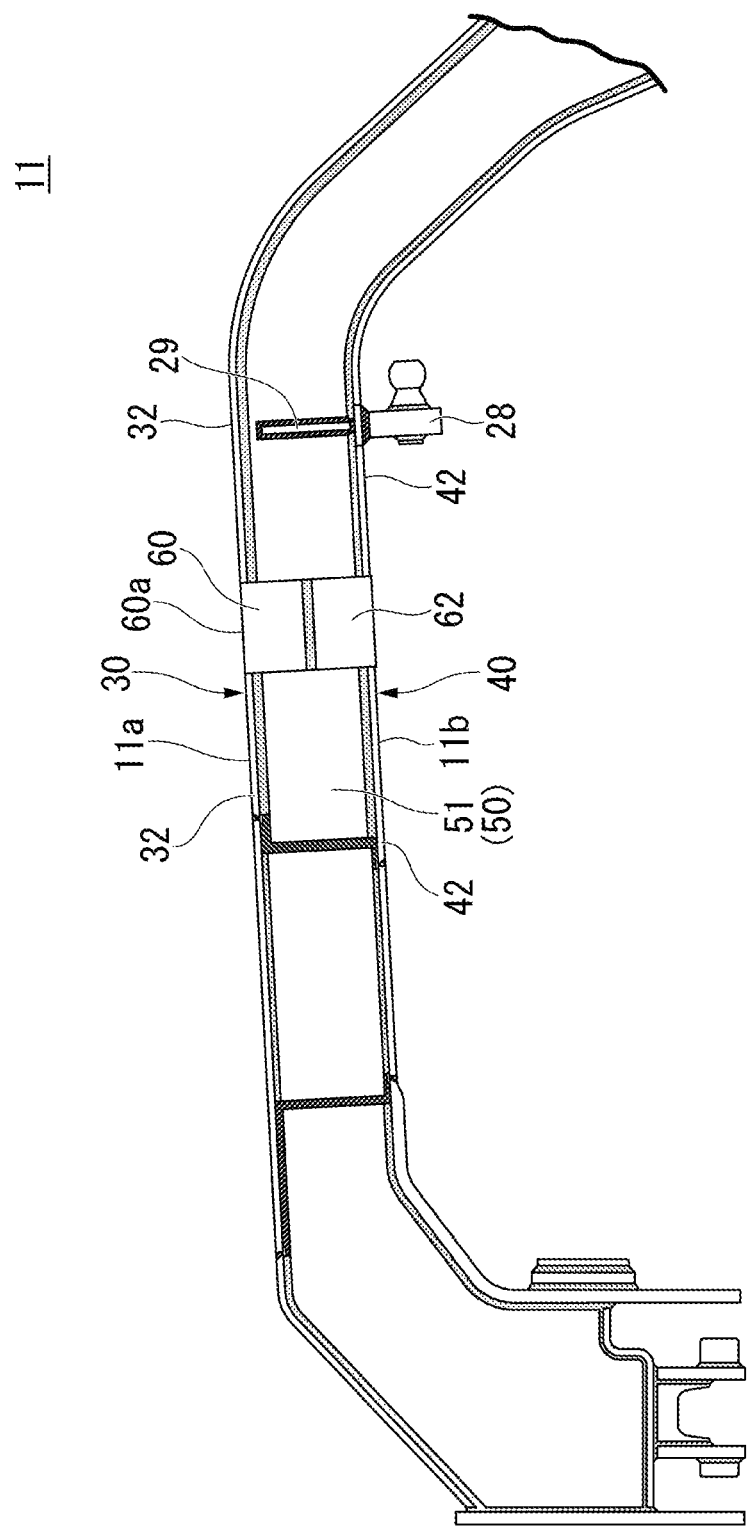
FIG. 3 is a left side view of the frame according to the embodiment.

As shown in FIG. 2, the front frame 11 extends along the front-rear direction. As shown in FIG. 3, a front portion of the front frame 11 is inclined to be positioned lower toward the front side in a side view seen from the left-right direction (hereinafter, referred to as a side view). A rear portion of the front frame 11 is inclined to be positioned lower toward the rear side in the side view. A central portion of the front frame 11 in the front-rear direction linearly extends along the front-rear direction. An upper surface 11a of the central portion of the front frame 11 in the front-rear direction has a flat surface along a horizontal plane. A bracket 28 that supports the drawbar shift cylinder 26 (refer to FIG. 1) is provided to a left lower portion of the front frame 11. In FIGS. 2 to 8, a light dot hatch indicates a welding spot in a first welding process described below, and a dark dot hatch (a dot hatch darker than the dot hatch in the first welding process) indicates a welding spot in a second welding process described below.

The front frame 11 is formed by welding a plurality of plate members. As shown in FIG. 2, the front frame 11 includes an upper plate 30, a lower plate 40, a vertical wall 50, and an attachment portion 60. A support portion 27 (refer to FIG. 1) that supports the lift cylinder 25 is provided behind the attachment portion 60. In the embodiment, the upper plate 30 includes a center portion 31, a first extension portion 32, a second extension portion 33, and a continuous portion 34, and the lower plate 40 includes a center portion 41, a first extension portion 42, a second extension portion 43, and a continuous portion 44 (refer to FIGS. 4 and 5).

Each of the center portions 31 and 41 is a portion which is near the central portion of the front frame 11 in the front-rear direction and is positioned above the blade 20.

The first extension portions 32 and 42 are portions respectively extending from the center portions 31 and 41 in the front-rear direction.

The second extension portions 33 and 43 are portions respectively extending from the center portions 31 and 41 in the left-right direction.

The continuous portions 34 and 44 are portions respectively connecting the first extension portion 32 to the second extension portion 33 and the first extension portion 42 to the second extension portion 43.

\<Upper Plate\>

Figure 4:
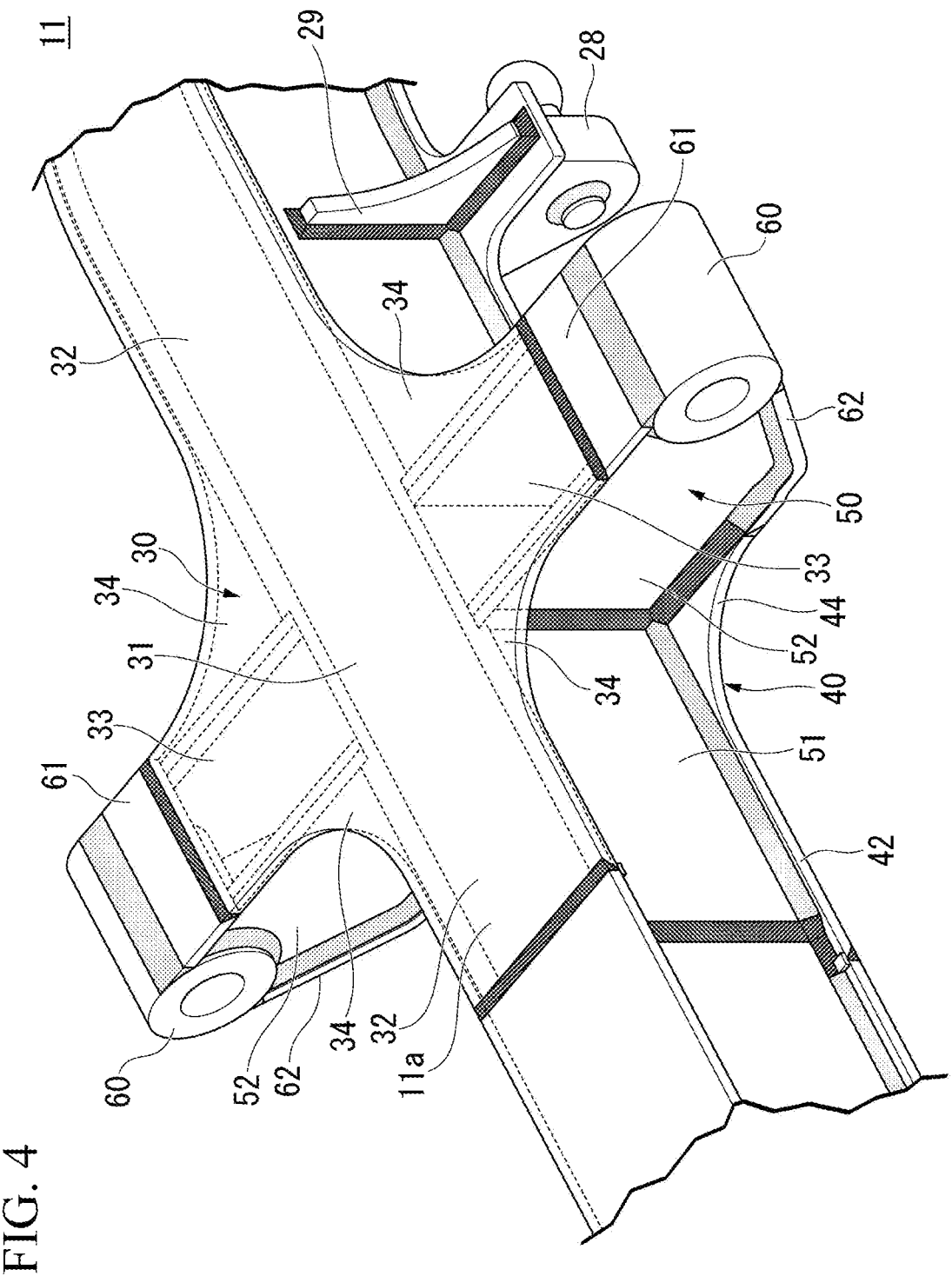
FIG. 4 is a perspective view of a main portion of the frame according to the embodiment obliquely seen from above.

As shown in FIG. 4, the upper plate 30 has a plate shape forming the upper surface 11a of the front frame 11. The upper plate 30 has a thickness in the up-down direction. The upper plate 30 has a cross shape when viewed from the up-down direction. The upper plate 30 includes the center portion 31, the first extension portion 32, the second extension portion 33, and the continuous portion 34. Hereinafter, the center portion 31 of the upper plate 30 is referred to as the "upper center portion 31", the first extension portion 32 of the upper plate 30 is referred to as the "first upper extension portion 32", the second extension portion 33 of the upper plate 30 is referred to as the "second upper extension portion 33", and the continuous portion 34 of the upper plate 30 is referred to as the "upper continuous portion 34". The upper center portion 31, the first upper extension portion 32, the second upper extension portion 33, and the upper continuous portion 34 are integrally formed by the same member.

The upper center portion 31 is a center portion of the upper plate 30 which has a cross shape when viewed from the up-down direction.

The first upper extension portion 32 is a portion extending from the upper center portion 31 in the front-rear direction. That is, the first upper extension portion 32 is a portion extending frontward and backward from the upper center portion 31.

The second upper extension portion 33 is a portion extending from the upper center portion 31 in the left-right direction. That is, the second upper extension portion 33 is a portion extending to the left and right from the upper center portion 31.

The upper continuous portion 34 is a portion connecting the first upper extension portion 32 to the second upper extension portion 33. That is, the upper continuous portion 34 is a portion covering four corner portions (right angle portions viewed from the up-down direction) formed by the first upper extension portion 32 and the second upper extension portion 33.

Figure 6:
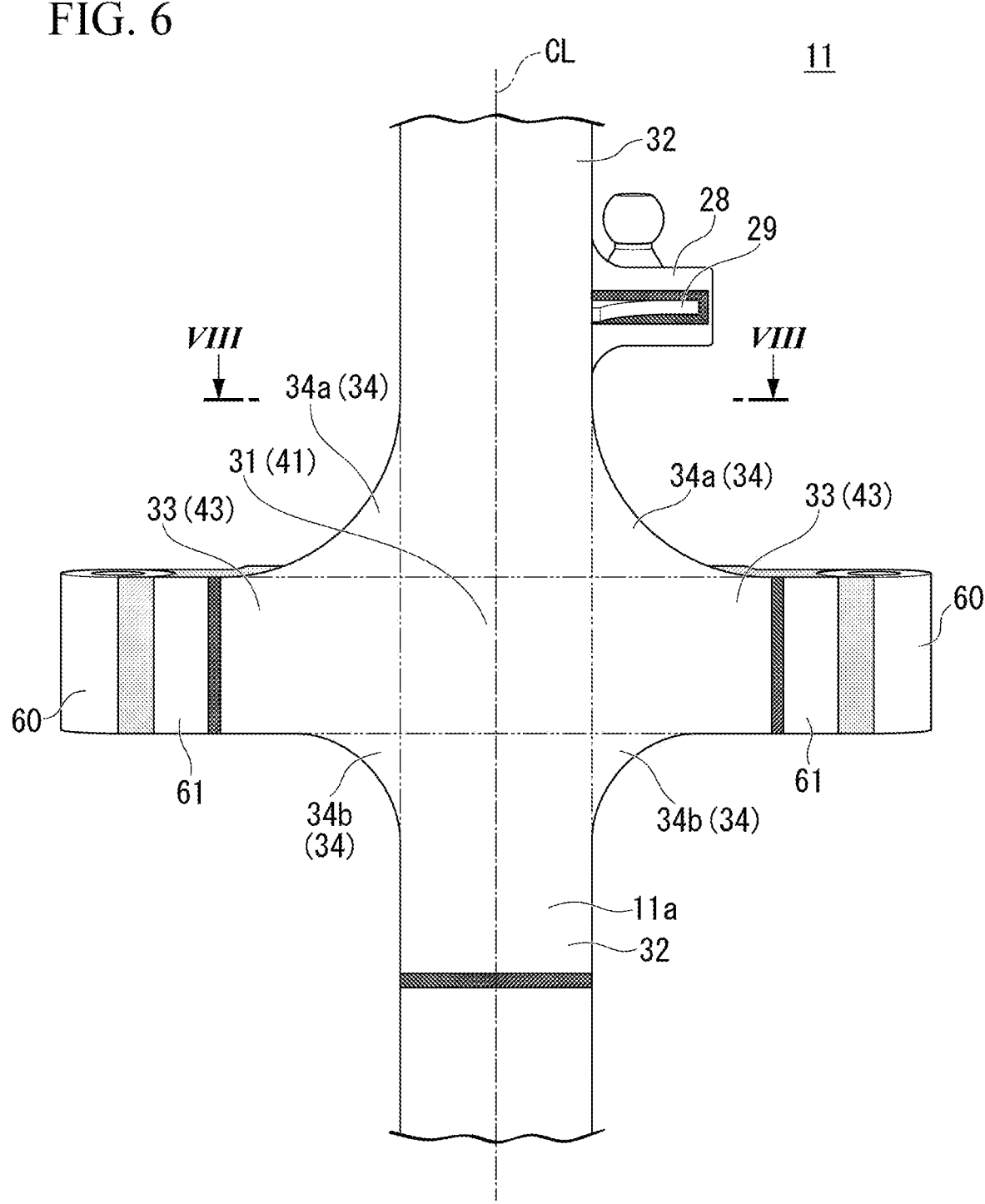
FIG. 6 is a top view of the main portion of the frame according to the embodiment.

The upper continuous portion 34 has a curved shape which is convex toward the center of the upper center portion 31 when viewed from the up-down direction (refer to FIG. 6).

As shown in FIG. 6, the upper continuous portion 34 has first upper curved portions 34a (first curved portions) and second upper curved portions 34b (second curved portions). The first upper curved portion 34a is a portion positioned on a side which is a rear side of the second upper extension portion 33 and where the support portion 27 (refer to FIG. 1) is provided. The second upper curved portion 34b is a portion positioned on a side which is a front side of the second upper extension portion 33 and where the support portion 27 is not provided. The first upper curved portion 34a has a radius of curvature larger than the second upper curved portion 34b when viewed from the up-down direction. A pair of left and right first upper curved portions 34a and a pair of left and right second upper curved portions 34b are provided.

<Lower Plate>

Figure 5:
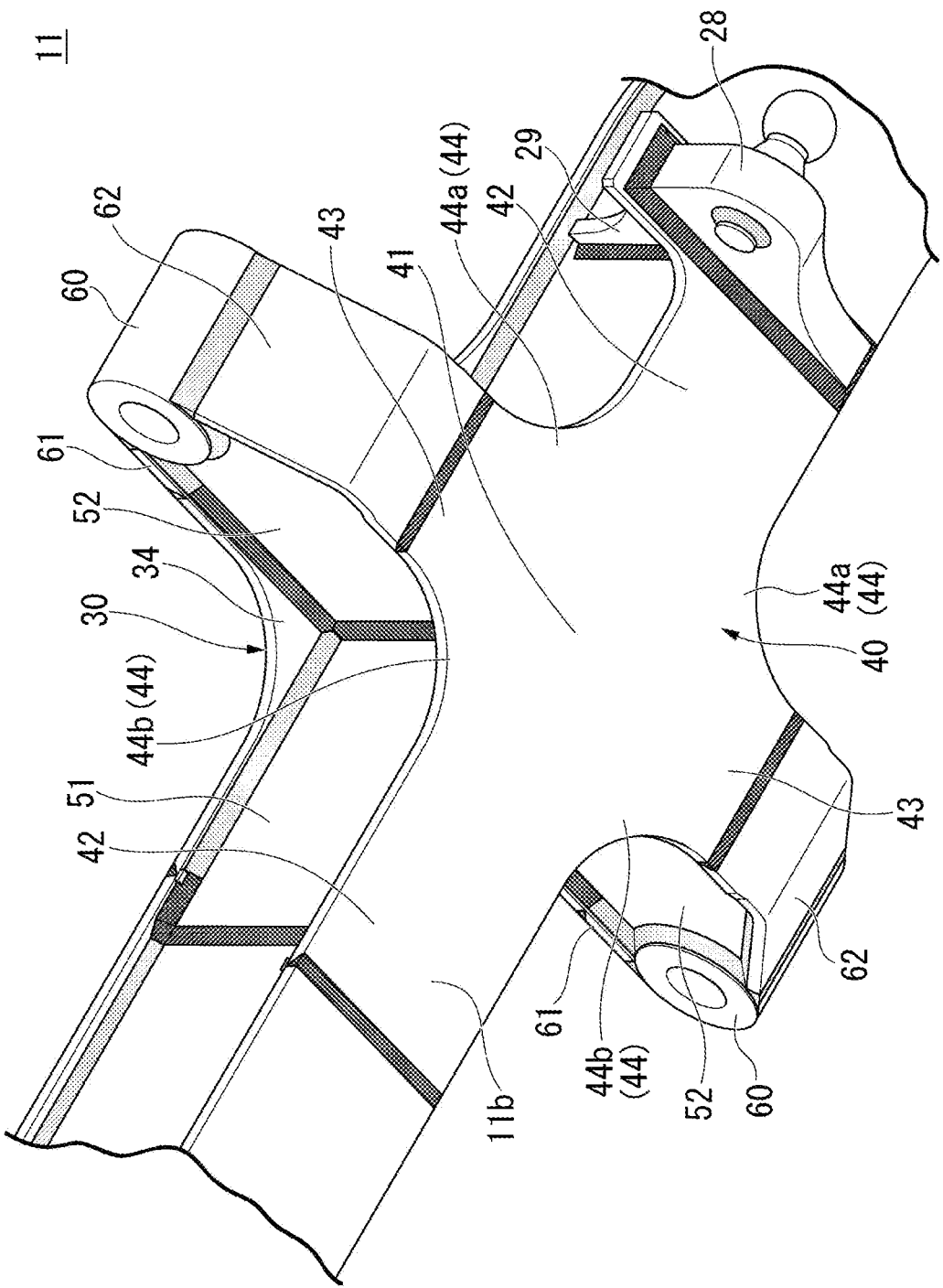
FIG. 5 is a perspective view of the main portion of the frame according to the embodiment obliquely seen from below.

As shown in FIG. 5, the lower plate 40 is opposite to the upper plate 30 in the up-down direction. The lower plate 40 has a plate shape forming a lower surface 11b of the front frame 11. The lower plate 40 has a thickness in the up-down direction. The lower plate 40 has a cross shape when viewed from the up-down direction. The lower plate 40 includes the center portion 41, the first extension portion 42, the second extension portion 43, and the continuous portion 44. Hereinafter, the center portion 41 of the lower plate 40 is referred to as the "lower center portion 41", the first extension portion 42 of the lower plate 40 is referred to as the "first lower extension portion 42", the second extension portion 43 of the lower plate 40 is referred to as the "second lower extension portion 43", and the continuous portion 44 of the lower plate 40 is referred to as the "lower continuous portion 44". The lower center portion 41, the first lower extension portion 42, the second lower extension portion 43, and the lower continuous portion 44 are integrally formed by the same member.

The lower center portion 41 is a portion opposite to the upper center portion 31 (refer to FIG. 4) in the up-down direction. The lower center portion 41 is a center portion of the lower plate 40 which has a cross shape when viewed from the up-down direction.

The first lower extension portion 42 is a portion extending from the lower center portion 41 in the front-rear direction. That is, the first lower extension portion 42 is a portion extending frontward and backward from the lower center portion 41.

The second lower extension portion 43 is a portion extending from the lower center portion 41 in the left-right direction. That is, the second lower extension portion 43 is a portion extending to the left and right from the lower center portion 41.

The lower continuous portion 44 is a portion connecting the first lower extension portion 42 to the second lower extension portion 43. That is, the lower continuous portion 44 is a portion covering a corner portion (right angle portion viewed from the up-down direction) formed by the first lower extension portion 42 and the second lower extension portion 43.

The lower continuous portion 44 has a curved shape which is convex toward the center of the lower center portion 41 when viewed from the up-down direction. The lower continuous portion 44 has first lower curved portions 44a (first curved portions) and second lower curved portions 44b (second curved portions). The first lower curved portion 44a is a portion positioned on a side which is a rear side of the second lower extension portion 43 and where the support portion 27 (refer to FIG. 1) is provided. The second lower curved portion 44b is a portion positioned on a side which is a front side of the second lower extension portion 43 and where the support portion 27 is not provided. The first lower curved portion 44a has a radius of curvature larger than the second lower curved portion 44b when viewed from the up-down direction. A pair of left and right first lower curved portions 44a and a pair of left and right second lower curved portions 44b are provided.

The upper center portion 31 and the lower center portion 41 are disposed at positions overlapping each other when viewed from the up-down direction (refer to FIG. 6). In the embodiment, the upper center portion 31 and the lower center portion 41 have the same outer shape when viewed from the up-down direction. In FIG. 6, the outer shape of the upper center portion 31 and the lower center portion 41 is indicated by a rectangular shape with a two-dot chain line. The second upper extension portion 33 and the second lower extension portion 43 have a line-symmetry shape with a virtual line CL, which passes through the center of the front frame 11 in the left-right direction, as the axis of symmetry when viewed from the up-down direction.

Figure 8:
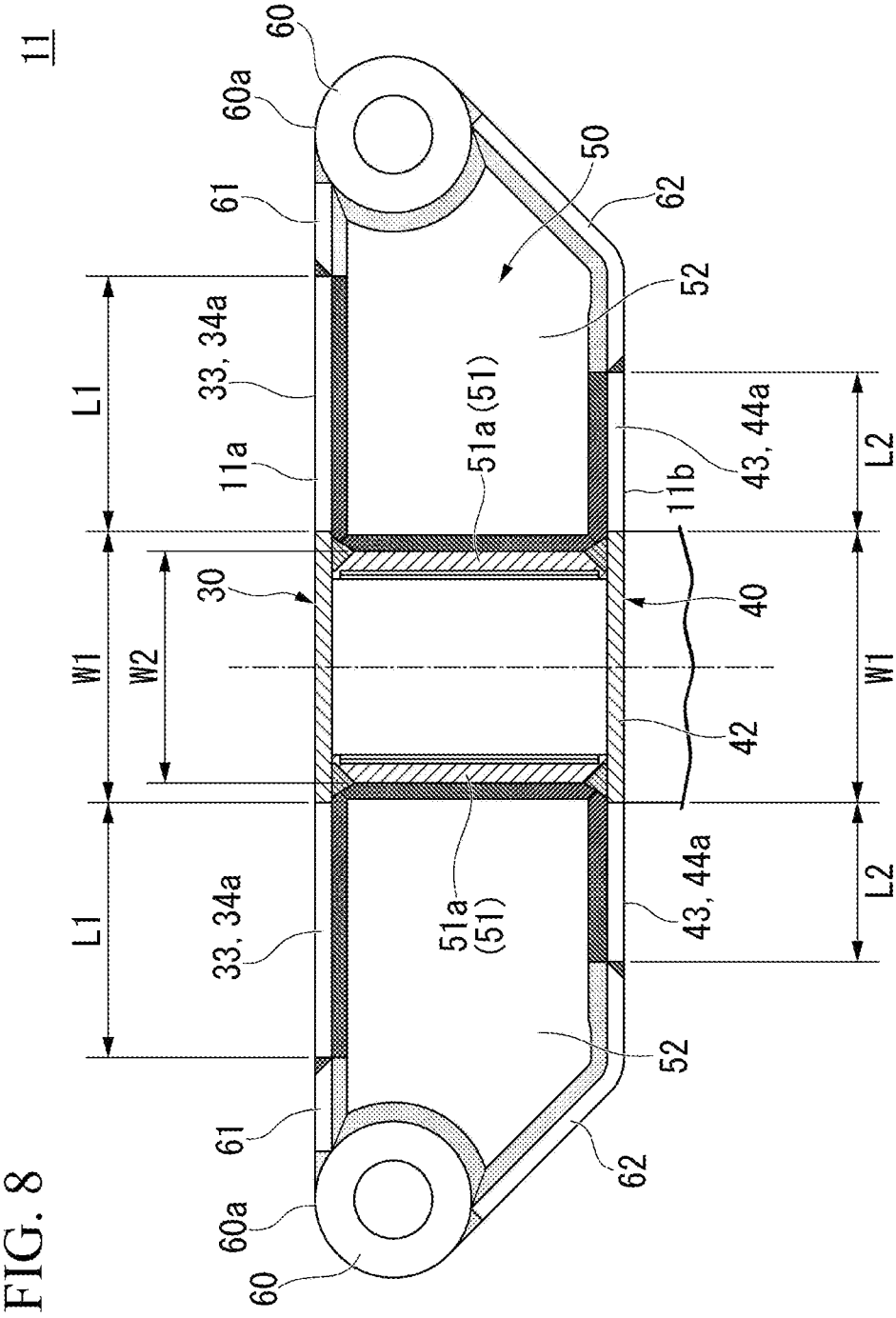
FIG. 8 is a cross-sectional view taken along line VIII-VIII of FIG. 6.

As shown in FIG. 8, a length L2 of the second lower extension portion 43 in the left-right direction is shorter than a length L1 of the second upper extension portion 33 in the left-right direction. Here, the length L1 of the second upper extension portion 33 in the left-right direction corresponds to the radius of curvature of the first upper curved portion 34a. The length L2 of the second lower extension portion 43 in the left-right direction corresponds to the radius of curvature of the first lower curved portion 44a.

<Vertical Wall>

The vertical wall 50 is disposed between the upper plate 30 and the lower plate 40 in the up-down direction. The vertical wall 50 connects the upper plate 30 to the lower plate 40. As shown in FIG. 4, the vertical wall 50 includes a first wall portion 51 and a second wall portion 52. An upper end of the vertical wall 50 is welded to the lower surface of the upper plate 30. A lower end of the vertical wall 50 is welded to the upper surface of the lower plate 40.

Figure 9:
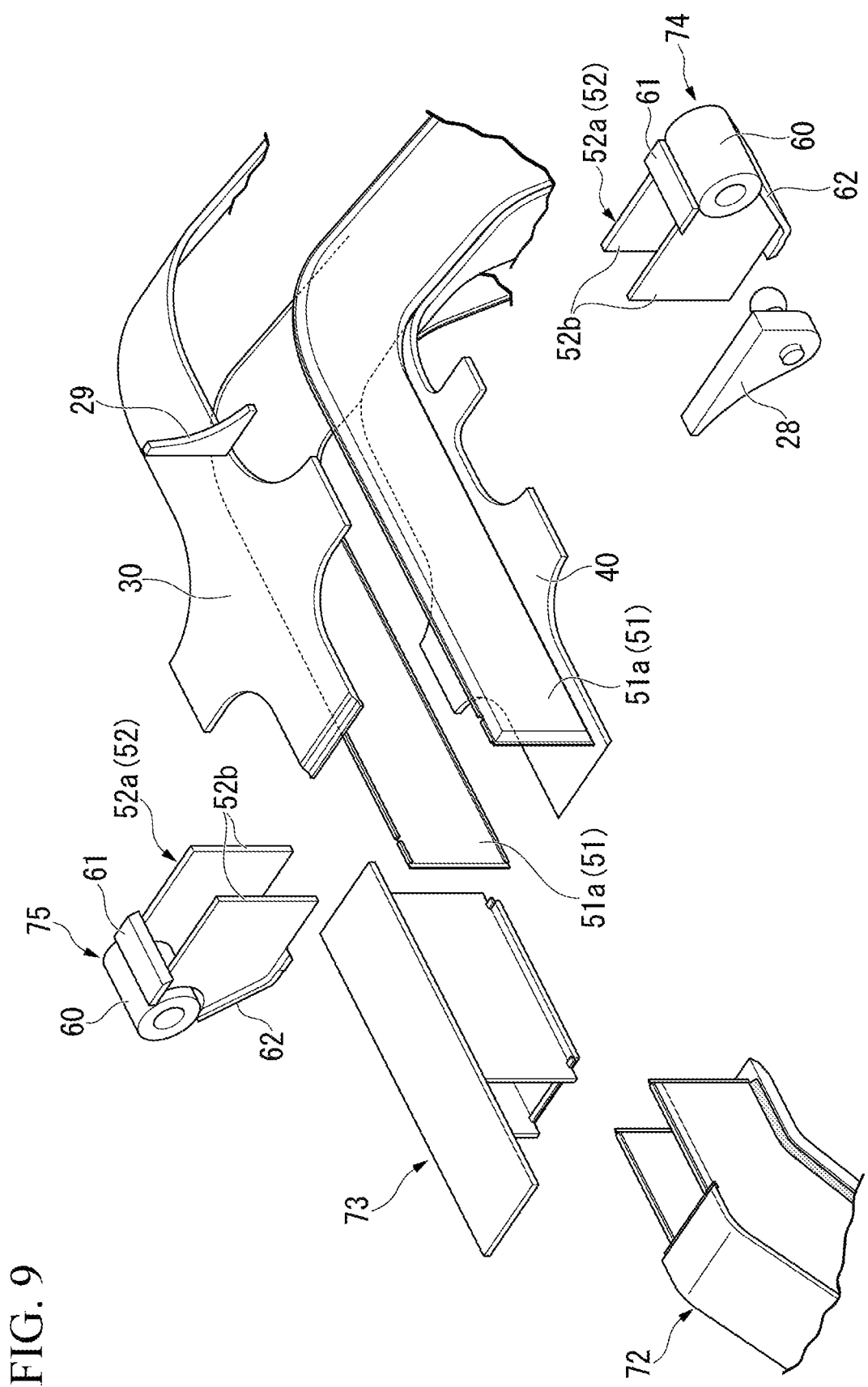
FIG. 9 is an explanatory diagram of a manufacturing process of the frame according to the embodiment.

The first wall portion 51 is a portion extending in the front-rear direction so as to be along the first upper extension portion 32 and the first lower extension portion 42. The first wall portion 51 is constituted by a pair of first side plates 51a disposed in parallel on the left and right (refer to FIG. 9). As shown in FIG. 9, each first side plate 51a extends in the front-rear direction and has a thickness in the left-right direction.

As shown in FIG. 8, the width of the first wall portion 51 in the left-right direction is shorter than the width of each of the first upper extension portion 32 and the first lower extension portion 42 in the left-right direction (W2<W1). In the drawing, the reference numeral W1 indicates the width of each of the first upper extension portion 32 and the first lower extension portion 42 in the left-right direction, and the reference numeral W2 indicates the width of the first wall portion 51 in the left-right direction.

Here, the width W2 of the first wall portion 51 in the left-right direction means a length between the left side surface and the right side surface of the first wall portion 51. That is, the width W2 of the first wall portion 51 in the left-right direction means a length (shortest distance) between outer side surfaces of the pair of left and right first side plates 51a in the left-right direction. In the embodiment, the width W2 of the first wall portion 51 in the left-right direction is shorter than the width W1 of each of the first upper extension portion 32 and the first lower extension portion 42 in the left-right direction by a welding margin.

As shown in FIG. 4, the second wall portion 52 is a portion extending in the left-right direction so as to be along the second upper extension portion 33 and the second lower extension portion 43 (refer to FIG. 5). The second wall portion 52 is constituted by a pair of second walls 52a that are disposed the left and right via the first wall portion 51 (refer to FIG. 9). An inner end of each of the second walls 52a in the left-right direction is welded to the outer side surface of the first wall portion 51 in the left-right direction (refer to FIG. 4). As shown in FIG. 9, each of the second walls 52a is constituted by a pair of second side plates 52b disposed in parallel on the front and rear. Each of the second side plates 52b extends in the left-right direction and has a thickness in the front-rear direction.

Figure 7:
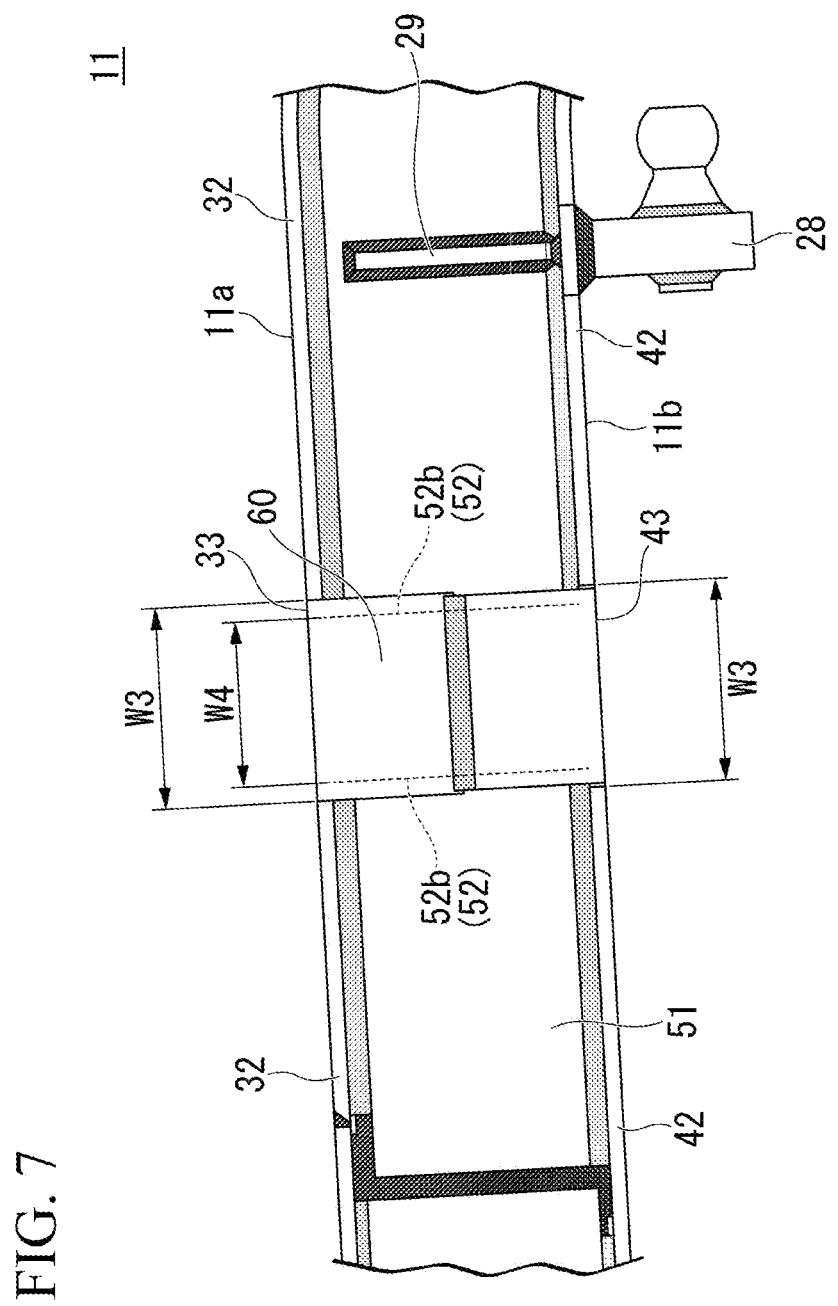
FIG. 7 is a left side view of the main portion of the frame according to the embodiment.

As shown in FIG. 7, the width of the second wall portion 52 in the front-rear direction is shorter than the width of each of the second upper extension portion 33 and the second lower extension portion 43 in the front-rear direction (W4<W3). In the drawing, the reference numeral W3 indicates the width of each of the second upper extension portion 33 and the second lower extension portion 43 in the front-rear direction, and the reference numeral W4 indicates the width of the second wall portion 52 in the front-rear direction.

Here, the width W4 of the second wall portion 52 in the front-rear direction means a length between the front surface and the rear surface of the second wall portion 52. That is, the width W4 of the second wall portion 52 in the front-rear direction means a length (shortest distance) between outer side surfaces of the pair of front and rear second side plates 52b in the front-rear direction. In the embodiment, the width W4 of the second wall portion 52 in the front-rear direction is shorter than the width W3 of each of the second upper extension portion 33 and the second lower extension portion 43 in the front-rear direction by a welding margin.

<Attachment Portion>

The attachment portion 60 is a portion to which the lift cylinder 25 (refer to FIG. 1) is attached. As shown in FIG. 4, the attachment portion 60 is provided to each of both ends of the second upper extension portion 33 in the left-right direction. The attachment portion 60 has a cylindrical shape with an axis along the front-rear direction as a central axis. The attachment portion 60 is connected to each of the second upper extension portion 33 and the second lower extension portion 43 (refer to FIG. 5) via an upper connection plate 61 and a lower connection plate 62. The upper connection plate 61 extends in the front-rear direction and has a thickness in the up-down direction. The lower connection plate 62 is inclined to be positioned lower toward the inner side in the left-right direction from a lower end of the attachment portion 60 and then extends inward in the left-right direction by being curved (refer to FIG. 8).

As shown in FIG. 8, an upper end 60a of the attachment portion 60 is welded to an outer end of the upper connection plate 61 in the left-right direction. An inner end of the upper connection plate 61 in the left-right direction is welded to an outer end of the second upper extension portion 33 in the left-right direction (refer to FIG. 4).

The lower end of the attachment portion 60 is welded to the outer end of the lower connection plate 62 in the left-right direction. An inner end of the lower connection plate 62 in the left-right direction is welded to an outer end of the second lower extension portion 43 in the left-right direction (refer to FIG. 5).

As shown in FIG. 8, the upper end 60a of the attachment portion 60 is disposed at the same height as the height of the upper surface of the upper plate 30 in the up-down direction. That is, the upper end 60a of the attachment portion 60 is disposed at the same height as the height of the upper surface 11a of the central portion of the front frame 11 in the front-rear direction (refer to FIG. 3). In the embodiment, the upper ends 60a of the left and right attachment portions 60 are disposed at the same height as the height of the upper surface of the upper plate 30 and the heights of the upper surfaces of the left and right upper connection plates 61 in the up-down direction. That is, the upper ends 60a of the left and right attachment portions 60, the upper surface of the upper plate 30, and the upper surfaces of the left and right upper connection plates 61 are disposed on the same plane.

<Manufacturing Method of Front Frame>

A manufacturing method of the front frame 11 includes a first welding process and a second welding process.

In the first welding process, so-called sub-assembly in which a plurality of plate members constituting the front frame 11 are welded in units of a structure smaller than the entire front frame 11 is performed. In the first welding process, sub-assembly of a plurality of structures is performed. In the embodiment, as the plurality of structures, sub-assembly of five structures of a first structure 71, a second structure 72, a third structure 73, a fourth structure 74, and a fifth structure 75 is performed (refer to FIGS. 9 and 10).

Figure 10:
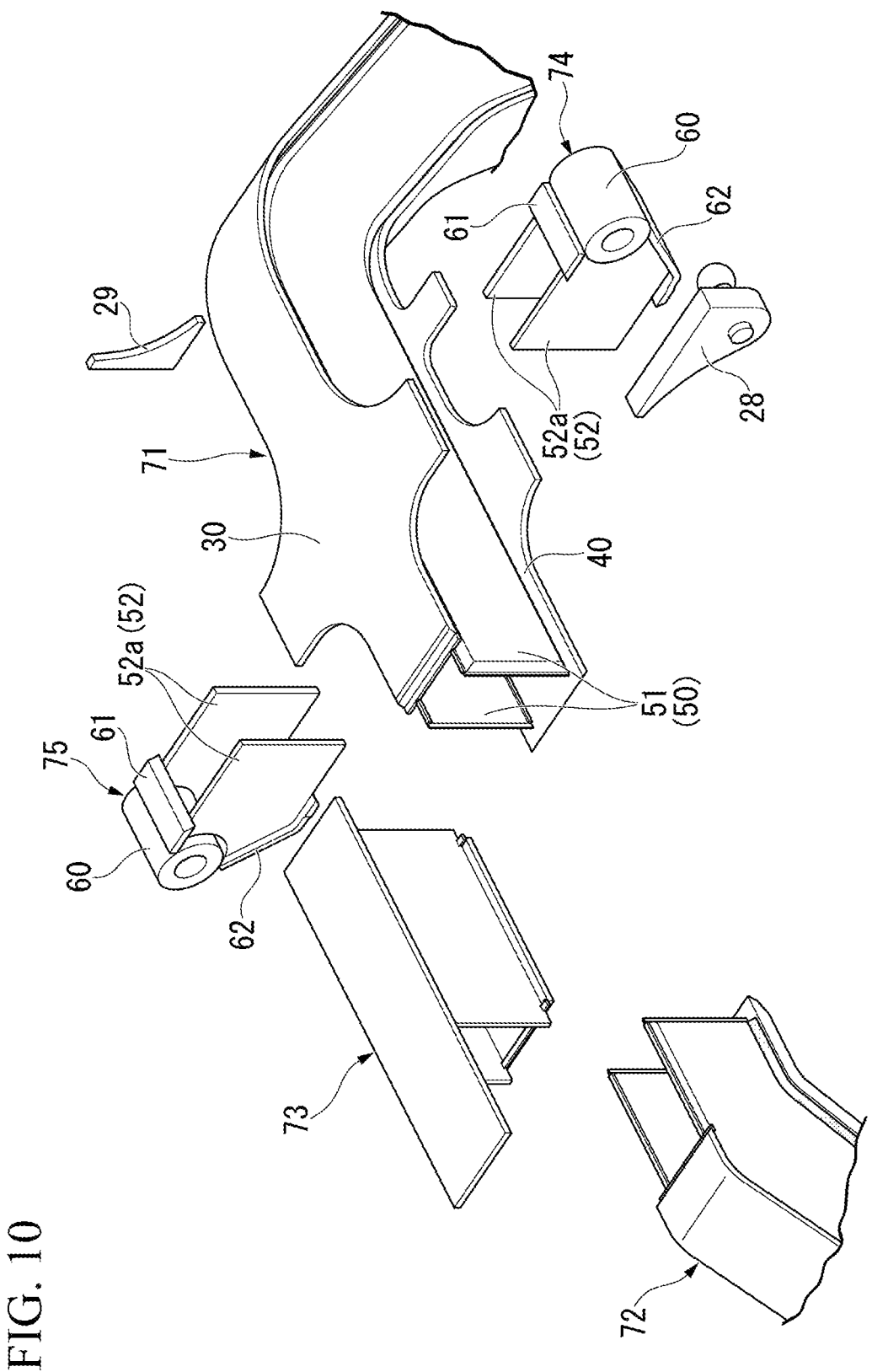
FIG. 10 is an explanatory diagram of the manufacturing process of the frame according to the embodiment following FIG. 9.

As shown in FIG. 10, the first structure 71 is a structure including the upper plate 30, the lower plate 40, and the first wall portion 51 of the vertical wall 50. The second structure 72 is a structure constituting the front portion of the front frame 11. The third structure 73 is a structure that connects the first structure 71 to the second structure 72. The fourth structure 74 is a structure including the attachment portion 60, the second wall 52a of the vertical wall 50, the upper connection plate 61, and the lower connection plate 62 and is a structure disposed on the left side as one side in the left-right direction. The fifth structure 75 is a structure including the attachment portion 60, the second wall 52a of the vertical wall 50, the upper connection plate 61, and the lower connection plate 62 which are on the right side as the other side in the left-right direction. A rib plate 29 is a reinforcing member for ensuring the mechanical strength of the attachment portion of the bracket 28.

After the first welding process, the second welding process is performed. In the second welding process, the first structure 71, the second structure 72, the third structure 73, the fourth structure 74, the fifth structure 75, the bracket 28, and the rib plate 29 are welded. In this manner, the front frame 11 is completed (refer to FIG. 2).

<Operation and Effects>

For example, in a case where grading or the like is performed by the motor grader, the motor grader travels while the blade is in contact with the ground by being lowered by the lift cylinder. In this case, the blade is pulled on the ground in the front-rear direction. Therefore, the blade receives a load from the front-rear direction by a load received from the excavated earth. Further, the blade also receives a load from the up-down direction by a load received from unevenness of the road surface and rocks, in some cases. In this case, a torsional stress around the axis along a left-right direction occurs in the vicinity of the bracket of the front frame which supports the lift cylinder.

For example, in a case where a load is applied to the blade in the up-down direction, the load may be different on a left side portion and a right side portion of the blade. In this case, a torsional stress around the axis along the front-rear direction occurs in the vicinity of the bracket of the front frame which supports the lift cylinder.

Here, in a configuration in which the bracket for supporting the lift cylinder is provided to the front frame extending along the front-rear direction, in a case where the bracket is merely welded to the left and right side surfaces of the front frame, the following problems may occur.

In this case, in a case where the blade receives a load from the front-rear direction, the stress applied to the front frame from the blade via the lift cylinder is concentrated on the base portion of the bracket. Further, in a case where a load is applied to the blade in the up-down direction, even when the load is different on the left side portion and the right side portion of the blade, the stress applied to the front frame from the blade via the lift cylinder is concentrated on the base portion of the bracket. Therefore, due to the concentration of the stress on the base portion of the bracket, cracks may occur at the base portion of the bracket.

In contrast, the front frame 11 of the embodiment includes the upper plate 30 that has a plate shape and that forms the upper surface 11a of the front frame 11 extending along the front-rear direction, the lower plate 40 that has a plate shape and that is opposite to the upper plate 30 in the up-down direction and forms the lower surface 11b of the front frame 11, the vertical wall 50 that is disposed between the upper plate 30 and the lower plate 40 in the up-down direction and connects the upper plate 30 to the lower plate 40, and the attachment portion 60 to which the lift cylinder 25 capable of moving the blade 20 in the up-down direction is attached. The upper plate 30 includes the center portion 31, the first extension portion 32 extending from the center portion 31 in the front-rear direction, the second extension portion 33 extending from the center portion 31 in the left-right direction, and the continuous portion 34 connecting the first extension portion 32 to the second extension portion 33, and the lower plate 40 includes the center portion 41, the first extension portion 42 extending from the center portion 41 in the front-rear direction, the second extension portion 43 extending from the center portion 41 in the left-right direction, and the continuous portion 44 connecting the first extension portion 42 to the second extension portion 43. The attachment portion 60 is provided to each of both ends of the second extension portions 33 and 43 in the left-right direction.

Thus, in a case where the blade 20 receives a load from the front-rear direction, the load applied to the front frame 11 from the blade 20 via the lift cylinder 25 is distributed to the entire front frame 11 via the continuous portions 34 and 44 and the second extension portions 33 and 43. Therefore, the configuration becomes more resistant to the torsion around the axis along the left-right direction as compared with a configuration in which the continuous portions 34 and 44 are not provided (configuration in which the bracket is merely welded to the left and right side surfaces of the front frame). Further, in a case where a load is applied to the blade 20 in the up-down direction, even when the load is different on the left side portion and the right side portion of the blade 20, the load applied to the front frame 11 from the blade 20 via the lift cylinder 25 is distributed to the entire front frame 11 via the continuous portions 34 and 44 and the second extension portions 33 and 43. Therefore, the configuration becomes more resistant to the torsion around the axis along the front-rear direction as compared with a configuration in which the continuous portions 34 and 44 are not provided. Accordingly, it is possible to improve the mechanical strength of the structure portion supporting the lift cylinder 25. Furthermore, in the embodiment, the upper plate 30 includes the upper center portion 31, the first upper extension portion 32, the second upper extension portion 33, and the upper continuous portion 34. The lower plate 40 includes the lower center portion 41, the first lower extension portion 42, the second lower extension portion 43, and the lower continuous portion 44. Therefore, it is possible to provide the front frame 11 that can withstand a load applied via the lift cylinder 25 by ensuring the strength of the entire front frame 11 and improving the mechanical strength of the structure portion supporting the lift cylinder 25 as compared with a case in which only one of the upper plate 30 and the lower plate 40 includes the center portion, the first extension portion, the second extension portion, and the continuous portion.

In the embodiment, the upper center portion 31, the first upper extension portion 32, the second upper extension portion 33, and the upper continuous portion 34 are integrally formed by the same member, and the lower center portion 41, the first lower extension portion 42, the second lower extension portion 43, and the lower continuous portion 44 are integrally formed by the same member. That is, the elements of the upper plate 30 and the elements of the lower plate 40 are integrally formed by the same member, respectively. Therefore, it is possible to provide the front frame 11 that can withstand a load applied via the lift cylinder 25 by ensuring the strength of the entire front frame 11 and improving the mechanical strength of the structure portion supporting the lift cylinder 25 as compared with a case in which elements of the upper plate 30 and the elements of the lower plate 40 are integrally formed by different members, respectively.

In the embodiment, the continuous portions 34 and 44 have a curved shape which is convex toward the center portions 31 and 41 when viewed from the up-down direction. With this configuration, since the load applied to the front frame 11 from the blade 20 via the lift cylinder 25 can be released along the curved shape of the continuous portions 34 and 44, it is possible to provide the front frame 11 that can withstand a load applied via the lift cylinder 25 by improving the mechanical strength of the structure portion supporting the lift cylinder 25.

In the embodiment, the support portion 27 that supports the lift cylinder 25 is provided behind the attachment portion 60. The continuous portion 34 has the first curved portions 34a positioned on a side which is a rear side of the attachment portion 60 and where the support portion 27 is provided, and the second curved portions 34b positioned on a side which is a front side of the attachment portion 60 and where the support portion 27 is not provided, and the continuous portion 44 has the first curved portions 44a positioned on a side which is a rear side of the attachment portion 60 and where the support portion 27 is provided, and the second curved portions 44b positioned on a side which is a front side of the attachment portion 60 and where the support portion 27 is not provided. The first curved portions 34a and 44a have a radius of curvature larger than the second curved portions 34b and 44b when viewed from the up-down direction.

With this configuration, the load applied to the front frame 11 from the blade 20 via the lift cylinder 25 can be released along the curved shape of the first curved portions 34a and 44a and the second curved portions 34b and 44b.

In the embodiment, since a larger load is applied to the rear side of the attachment portion 60 where the support portion 27 is provided than to the front side of the attachment portion 60, the first curved portions 34a and 44a have a larger radius of curvature than the second curved portions 34b and 44b.

In the embodiment, a pair of the left and right first upper curved portions 34a and a pair of the left and right first lower curved portions 44a are provided as the above-described first curved portions 34a and 44a, and a pair of the left and right second upper curved portions 34b and a pair of the left and right second lower curved portions 44b are provided as the above-described second curved portions 34b and 44b. Therefore, the load applied to the front frame 11 from the blade 20 via the left and right lift cylinders 25 can be released along the curved shape of the left and right first upper curved portions 34a, the left and right first lower curved portions 44a, the left and right second upper curved portions 34b, and the left and right second lower curved portions 44b. Accordingly, it is possible to provide the front frame 11 that can withstand a load applied via the lift cylinder 25 by improving the mechanical strength of the structure portion supporting the lift cylinder 25.

In the embodiment, the upper end 60a of the attachment portion 60 is disposed at the same height as the height of the upper surface 11a of the upper plate 30 in the up-down direction.

As compared with a case where the upper end 60a of the attachment portion 60 is disposed higher than the upper surface 11a of the upper plate 30 in the up-down direction, the front frame 11 according to the embodiment has a structure having no protrusion portion that obstructs the forward view of the driver who is riding in the cab 6, and therefore, it is possible to improve the forward visibility of the driver. For example, when the driver works while observing the tires of the front wheels 2 of the motor grader 1 or the road surface condition in front, it is possible to suppress degradation of the forward visibility as much as possible with the front frame 11 according to the embodiment.

In the embodiment, the upper surface 11a of the central portion of the front frame 11 in the front-rear direction has the flat surface along the horizontal plane. The upper ends 60a of the left and right attachment portions 60, the upper surface of the upper plate 30, and the upper surfaces of the left and right upper connection plates 61 of the front frame 11 are disposed on the same plane. The front frame 11 according to the embodiment has a structure having no protrusion portion that obstructs the forward view of the driver who is riding in the cab 6, and therefore, it is possible to improve the forward visibility of the driver as much as possible.

Further, it is sufficient that a bent portion is provided only to the lower connection plate 62 among the upper connection plate 61 and the lower connection plate 62, and it is not necessary to provide a bent portion to each of the upper connection plate 61 and the lower connection plate 62, which is excellent in productivity.

In the embodiment, the upper center portion 31 and the lower center portion 41 have the same outer shape when viewed from the up-down direction.

With this configuration, as compared with a case where the upper center portion 31 and the lower center portion 41 have different outer shapes when viewed from the up-down direction, the load applied to the front frame 11 from the blade 20 via the lift cylinder 25 is easily released in a well-balanced manner in the up-down direction. Accordingly, it is possible to provide the front frame 11 that can withstand a load applied via the lift cylinder 25 by improving the mechanical strength of the structure portion supporting the lift cylinder 25.

In the embodiment, the vertical wall 50 includes the first wall portion 51 which extends in the front-rear direction so as to be along the first upper extension portion 32 and the first lower extension portion 42 and has a width in the left-right direction smaller than the first upper extension portion 32 and the first lower extension portion 42, and the second wall portion 52 which extends in the left-right direction so as to be along the second upper extension portion 33 and the second lower extension portion 43 and has a width in the front-rear direction smaller than the second upper extension portion 33 and the second lower extension portion 43.

With this configuration, as compared with a case where the first wall portion 51 has the same width in the left-right direction as the first upper extension portion 32 and the first lower extension portion 42, it is easy to weld the first wall portion 51 to the first upper extension portion 32 and the first lower extension portion 42. Further, as compared with a case where the second wall portion 52 has the same width in the front-rear direction as the second upper extension portion 33 and the second lower extension portion 43, it is easy to weld the second wall portion 52 to the second upper extension portion 33 and the second lower extension portion 43. Accordingly, it is possible to improve the workability (productivity) when welding the vertical wall 50.

Other Embodiments

In the above-described embodiment, an example in which the upper plate 30 includes the center portion 31, the first extension portion 32, the second extension portion, and the continuous portion 34, and the lower plate 40 includes the center portion 41, the first extension portion 42, the second extension portion, and the continuous portion 44 is described, but the invention is not limited thereto. For example, only the upper plate 30 may include the center portion 31, the first extension portion 32, the second extension portion 33, and the continuous portion 34. Alternatively, only the lower plate 40 may include the center portion 41, the first extension portion 42, the second extension portion 43, and the continuous portion 44. That is, it is sufficient that at least one of the upper plate 30 and the lower plate 40 forms a flat surface having a cross shape when viewed from the up-down direction and includes the center portion, the first extension portion, the second extension portion, and the continuous portion.

In the above-described embodiment, an example in which the elements of the upper plate 30 and the elements of the lower plate 40 are integrally formed by the same member, respectively is described, but the invention is not limited thereto. For example, the elements of the upper plate 30 and the elements of the lower plate 40 may be integrally formed by different members, respectively. For example, part of elements of each of the upper plate 30 and the lower plate 40 may be formed by different members from the other elements, and the part of elements and the other elements may be formed integrally.

In the above-described embodiment, an example in which the continuous portions 34 and 44 have a curved shape which is convex toward the center portions 31 and 41 when viewed from the up-down direction is described, but the invention is not limited thereto. For example, the continuous portions 34 and 44 may have a linear shape extending in a direction obliquely intersecting the front-rear direction when viewed from the up-down direction.

In the above-described embodiment, an example in which the first curved portions 34a and 44a have a radius of curvature larger than the second curved portions 34b and 44b when viewed from the up-down direction is described, but the invention is not limited thereto. For example, the first curved portions 34a and 44a may have the same radius of curvature as the second curved portions 34b and 44b when viewed from the up-down direction. It is sufficient that the radius of curvature of the curved portion provided at least on the side where the support portion 27 supporting the lift cylinder 25 is provided is larger than the radius of curvature of the curved portion provided on a side where the support portion 27 is not provided.

In the above-described embodiment, an example in which the support portion 27 supporting the lift cylinder 25 is provided behind the attachment portion 60, that is, on one side of the attachment portion 60 in the front-rear direction is described, but the invention is not limited thereto. For example, the support portion 27 supporting the lift cylinder 25 may be provided in front of the attachment portion 60, that is, on the other side of the attachment portion 60 in the front-rear direction.

In the above-described embodiment, an example in which the upper end 60a of the attachment portion 60 is disposed at the same height as the upper surface of the upper plate 30 in the up-down direction is described, but the invention is not limited thereto. For example, the upper end 60a of the attachment portion 60 may be disposed lower than the upper surface of the upper plate 30 in the up-down direction. In contrast, the upper end 60a of the attachment portion 60 may be disposed higher than the upper surface of the upper plate 30 in the up-down direction.

In the above-described embodiment, an example in which the upper center portion 31 and the lower center portion 41 have the same outer shape when viewed from the up-down direction is described, but the invention is not limited thereto. For example, the upper center portion 31 and the lower center portion 41 may have different outer shapes when viewed from the up-down direction.

In the above-described embodiment, an example in which the width W2 of the first wall portion 51 in the left-right direction is shorter than the width W1 of each of the first upper extension portion 32 and the first lower extension portion 42 in the left-right direction (W2<W1) is described, but the invention is not limited thereto. For example, the width W2 of the first wall portion 51 in the left-right direction may be equal to or greater than the width W1 of each of the first upper extension portion 32 and the first lower extension portion 42 in the left-right direction (W2≥W1).

In the above-described embodiment, an example in which the width W4 of the second wall portion 52 in the front-rear direction is shorter than the width W3 of each of the second upper extension portion 33 and the second lower extension portion 43 in the front-rear direction (W4<W3) is described, but the invention is not limited thereto. For example, the width W4 of the second wall portion 52 in the front-rear direction may be equal to or greater than the width W3 of each of the second upper extension portion 33 and the second lower extension portion 43 in the front-rear direction (W4≥W3).

In the above-described embodiment, an example in which the invention is applied to the motor grader 1 including the attachment portion 60 to which the lift cylinder 25 capable of moving the blade 20 in the up-down direction is attached as an example of the work vehicle is described, but the invention is not limited thereto. For example, the invention may be applied to other work vehicles to which the lift cylinder 25 capable of moving work attachments other than the blade 20 in the up-down direction is attached. The invention may be applied to a work vehicle to which, for example, the scarifier is attached instead of the blade 20.

The embodiments of the invention have been described above, but the invention is not limited thereto, additions, omissions, substitutions, and other modifications of the configuration can be made without departing from the spirit of the invention, and the above-described embodiments can be appropriately combined.

REFERENCE SIGNS LIST

1 Motor grader (work vehicle)
7 Work equipment
11 Front frame (frame)
11a Upper surface of front frame (upper surface of frame)
11b Lower surface of front frame (lower surface of frame)
25 Lift cylinder (actuator)
27 Support portion
30 Upper plate
31 Upper center portion (center portion)
32 First upper extension portion (first extension portion)
33 Second upper extension portion (second extension portion)
34 Upper continuous portion (continuous portion)
34a First upper curved portion (first curved portion)
34b Second upper curved portion (second curved portion)
40 Lower plate
41 Lower center portion (center portion)
42 First lower extension portion (first extension portion)
43 Second lower extension portion (second extension portion)
44 Lower continuous portion
44a First lower curved portion (first curved portion)
44b Second lower curved portion (second curved portion)
50 Vertical wall
51 First wall portion
52 Second wall portion
60 Attachment portion
60a Upper end of attachment portion
CL Virtual line
W1 Width of first extension portion in left-right direction
W2 Width of first wall portion in left-right direction
W3 Width of second extension portion in front-rear direction
W4 Width of second wall portion in front-rear direction

The invention claimed is:
1. A frame of a work vehicle, the frame comprising:
an upper plate that has a plate shape and that forms an upper surface of the frame extending along a front-rear direction;
a lower plate that has a plate shape and that is opposite to the upper plate in an up-down direction and forms a lower surface of the frame;

a vertical wall that is disposed between the upper plate and the lower plate in the up-down direction and connects the upper plate to the lower plate; and
an attachment portion to which an actuator that moves work equipment in the up-down direction is attached,
wherein at least one of the upper plate and the lower plate includes
a center portion,
a first extension portion extending from the center portion in the front-rear direction,
a second extension portion extending from the center portion in a left-right direction, and
a continuous portion connecting the first extension portion to the second extension portion, and
wherein the attachment portion is provided at both ends of the second extension portion in the left-right direction.

2. The frame of a work vehicle according to claim 1,
wherein the continuous portion has a curved shape which is convex toward the center portion when viewed from the up-down direction.

3. The frame of a work vehicle according to claim 2,
wherein a support portion that supports the actuator is provided on one side of the attachment portion in the front-rear direction,
wherein the continuous portion has
a first curved portion positioned on a side which is one side in the front-rear direction and where the support portion is provided, and
a second curved portion positioned on a side which is the other side in the front-rear direction and where the support portion is not provided, and
wherein the first curved portion has a radius of curvature equal to or larger than a radius of curvature of the second curved portion when viewed from the up-down direction.

4. The frame of a work vehicle according to claim 1,
wherein an upper end of the attachment portion is disposed at a height equal to or lower than a height of the upper surface of the upper plate in the up-down direction.

5. The frame of a work vehicle according to claim 1,
wherein the upper plate includes
an upper center portion,
a first upper extension portion extending from the upper center portion in the front-rear direction,
a second upper extension portion extending from the upper center portion in the left-right direction, and
an upper continuous portion connecting the first upper extension portion to the second upper extension portion, and
wherein the lower plate includes
a lower center portion which is opposite to the upper center portion in the up-down direction,
a first lower extension portion extending from the lower center portion in the front-rear direction,
a second lower extension portion extending from the lower center portion in the left-right direction, and
a lower continuous portion connecting the first lower extension portion to the second lower extension portion.

6. The frame of a work vehicle according to claim 5,
wherein the upper center portion and the lower center portion have the same outer shape when viewed from the up-down direction.

7. The frame of a work vehicle according to claim 1,
wherein the vertical wall includes
a first wall portion which extends in the front-rear direction to be along the first extension portion, and has a smaller width in the left-right direction than the first extension portion, and
a second wall portion which extends in the left-right direction to be along the second extension portion, and has a smaller width in the front-rear direction than the second extension portion.

8. A work vehicle comprising the frame of a work vehicle according to claim 1.

9. The frame of a work vehicle according to claim 2,
wherein an upper end of the attachment portion is disposed at a height equal to or lower than a height of the upper surface of the upper plate in the up-down direction.

10. The frame of a work vehicle according to claim 3,
wherein an upper end of the attachment portion is disposed at a height equal to or lower than a height of the upper surface of the upper plate in the up-down direction.

11. The frame of a work vehicle according to claim 2,
wherein the upper plate includes
an upper center portion,
a first upper extension portion extending from the upper center portion in the front-rear direction,
a second upper extension portion extending from the upper center portion in the left-right direction, and
an upper continuous portion connecting the first upper extension portion to the second upper extension portion, and
wherein the lower plate includes
a lower center portion which is opposite to the upper center portion in the up-down direction,
a first lower extension portion extending from the lower center portion in the front-rear direction,
a second lower extension portion extending from the lower center portion in the left-right direction, and
a lower continuous portion connecting the first lower extension portion to the second lower extension portion.

12. The frame of a work vehicle according to claim 3,
wherein the upper plate includes
an upper center portion,
a first upper extension portion extending from the upper center portion in the front-rear direction,
a second upper extension portion extending from the upper center portion in the left-right direction, and
an upper continuous portion connecting the first upper extension portion to the second upper extension portion, and
wherein the lower plate includes
a lower center portion which is opposite to the upper center portion in the up-down direction,
a first lower extension portion extending from the lower center portion in the front-rear direction,
a second lower extension portion extending from the lower center portion in the left-right direction, and
a lower continuous portion connecting the first lower extension portion to the second lower extension portion.

13. The frame of a work vehicle according to claim 4,
wherein the upper plate includes
an upper center portion,
a first upper extension portion extending from the upper center portion in the front-rear direction,
a second upper extension portion extending from the upper center portion in the left-right direction, and an upper continuous portion connecting the first upper extension portion to the second upper extension portion, and wherein the lower plate includes a lower center portion which is opposite to the upper center portion in the up-down direction, a first lower extension portion extending from the lower center portion in the front-rear direction, a second lower extension portion extending from the lower center portion in the left-right direction, and a lower continuous portion connecting the first lower extension portion to the second lower extension portion.

14. The frame of a work vehicle according to claim 2, wherein the vertical wall includes a first wall portion which extends in the front-rear direction to be along the first extension portion, and has a smaller width in the left-right direction than the first extension portion, and a second wall portion which extends in the left-right direction to be along the second extension portion, and has a smaller width in the front-rear direction than the second extension portion.

15. The frame of a work vehicle according to claim 3, wherein the vertical wall includes a first wall portion which extends in the front-rear direction to be along the first extension portion, and has a smaller width in the left-right direction than the first extension portion, and a second wall portion which extends in the left-right direction to be along the second extension portion, and has a smaller width in the front-rear direction than the second extension portion.

16. The frame of a work vehicle according to claim 4, wherein the vertical wall includes a first wall portion which extends in the front-rear direction to be along the first extension portion, and has a smaller width in the left-right direction than the first extension portion, and a second wall portion which extends in the left-right direction to be along the second extension portion, and has a smaller width in the front-rear direction than the second extension portion.

17. The frame of a work vehicle according to claim 5, wherein the vertical wall includes a first wall portion which extends in the front-rear direction to be along the first extension portion, and has a smaller width in the left-right direction than the first extension portion, and a second wall portion which extends in the left-right direction to be along the second extension portion, and has a smaller width in the front-rear direction than the second extension portion.

18. A work vehicle comprising the frame of a work vehicle according to claim 2.

19. A work vehicle comprising the frame of a work vehicle according to claim 3.

20. A work vehicle comprising the frame of a work vehicle according to claim 5.

* * * * *